US012280818B2

(12) United States Patent
Kawamura et al.

(10) Patent No.: US 12,280,818 B2
(45) Date of Patent: Apr. 22, 2025

(54) STEERING COLUMN DEVICE

(71) Applicants: JTEKT CORPORATION, Kariya (JP); JTEKT COLUMN SYSTEMS CORPORATION, Kosai (JP)

(72) Inventors: Naofumi Kawamura, Kishiwada (JP); Hiroaki Suzuki, Toyota (JP); Tetsuya Ebisu, Shijonawate (JP); Yuki Fujioka, Kashiba (JP); Tomonori Sugiura, Yamatokoriyama (JP); Kosuke Ito, Shiki-gun (JP); Takahiro Baito, Kosai (JP); Takao Nakaaki, Kashihara (JP); Yoshiaki Murakami, Hamamatsu (JP); Kazuhisa Asakawa, Shiki-gun (JP)

(73) Assignees: JTEKT CORPORATION, Kariya (JP); JTEKT COLUMN SYSTEMS CORPORATION, Kosai (JP)

( * ) Notice: Subject to any disclaimer, the term of this patent is extended or adjusted under 35 U.S.C. 154(b) by 0 days.

(21) Appl. No.: 18/572,077

(22) PCT Filed: Jun. 25, 2021

(86) PCT No.: PCT/JP2021/024113
§ 371 (c)(1),
(2) Date: Dec. 19, 2023

(87) PCT Pub. No.: WO2022/269897
PCT Pub. Date: Dec. 29, 2022

(65) Prior Publication Data
US 2024/0286667 A1 Aug. 29, 2024

(51) Int. Cl.
*B62D 1/181* (2006.01)
*B62D 1/187* (2006.01)

(52) U.S. Cl.
CPC ............. *B62D 1/181* (2013.01); *B62D 1/187* (2013.01)

(58) Field of Classification Search
CPC .................................. B62D 1/181; B62D 1/187
See application file for complete search history.

(56) References Cited

U.S. PATENT DOCUMENTS 4,893,518 A * 1/1990 Matsumoto ............ B62D 1/181
74/495
8,979,126 B2 * 3/2015 Morinaga .............. B62D 1/181
280/775

(Continued)

FOREIGN PATENT DOCUMENTS

JP 2008-120229 A 5/2008
JP 2008-143441 A 6/2008

(Continued)

OTHER PUBLICATIONS

Woo et al., Electric steering column device for vehicle, Jun. 12, 2012, EPO, KR 2012-0060975 A, Machine Translation of Description ( Year: 2012).*

(Continued)

*Primary Examiner* — James A English
(74) *Attorney, Agent, or Firm* — Oliff PLC

(57) ABSTRACT

A steering column device includes a lower tube that is attached to a vehicle body so as to be pivotable in an up-down direction, a column shaft to which a steering wheel is attached, an upper tube that rotatably supports the column shaft and that also is attached to the lower tube so as to be movable in a front-rear direction, a motor for generating motor torque, a link mechanism that couples the lower tube and the upper tube so as to be capable of moving in conjunction, and a power transmission mechanism that acts to transmit the motor torque to the link mechanism. The link mechanism causes the pivoting of the lower tube in the up-down direction and the movement of the upper tube in the front-rear direction to be performed in conjunction, when the motor torque is transmitted to the link mechanism by the power transmission mechanism.

5 Claims, 11 Drawing Sheets

(56) References Cited

U.S. PATENT DOCUMENTS

| | | | | |
|---|---|---|---|---|
| 2002/0124677 | A1* | 9/2002 | Tomaru | B62D 1/181 280/775 |
| 2003/0120469 | A1* | 6/2003 | Baik | G05B 17/02 703/8 |
| 2006/0191368 | A1* | 8/2006 | Sawada | B62D 1/181 74/495 |
| 2009/0308189 | A1* | 12/2009 | Tomaru | F16H 25/2006 74/89.42 |
| 2012/0111656 | A1 | 5/2012 | Jung et al. | |
| 2012/0247259 | A1* | 10/2012 | Mizuno | B62D 1/181 74/493 |
| 2013/0160596 | A1* | 6/2013 | Tanaka | B62D 1/189 74/493 |
| 2019/0301574 | A1 | 10/2019 | Terada | |

FOREIGN PATENT DOCUMENTS

| | | |
|---|---|---|
| JP | 2010-036702 A | 2/2010 |
| JP | 2019-172002 A | 10/2019 |
| KR | 10-2012-0060975 A | 6/2012 |

OTHER PUBLICATIONS

Sep. 14, 2021 International Search Report issued in International Patent Application No. PCT/JP2021/024113.

* cited by examiner

STEERING COLUMN DEVICE

TECHNICAL FIELD

The present disclosure relates to a steering column device.

BACKGROUND ART

For example, a steering column device described in Patent Document 1 is installed in a vehicle. The steering column device described in Patent Document 1 includes an outer column, an inner column, an electrically-driven tilt mechanism, and an electrically-driven telescopic mechanism. The outer column is attached to a vehicle body attachment bracket so as to be pivotable in an up-down direction of the vehicle. The inner column rotatably supports a steering shaft to which a steering wheel is attached. The inner column is attached to the outer column so as to be movable in a front-rear direction of the vehicle.

The electrically-driven tilt mechanism includes a tilt driving motor, a ball screw mechanism, and a link mechanism. The tilt driving motor causes action of the ball screw mechanism via a reduction mechanism unit that is integrated with the tilt driving motor. The ball screw mechanism acts to move an internal thread member in the front-rear direction of the vehicle, along an axial line of an external thread shaft member, by rotating the external thread shaft member. The link mechanism acts to pivot the outer column in the up-down direction of the vehicle due to actions of the ball screw mechanism. This adjusts the position of the steering shaft in the up-down direction of the vehicle.

The electrically-driven telescopic mechanism includes a telescopic driving motor and the ball screw mechanism. The telescopic driving motor causes action of the ball screw mechanism via a reduction mechanism unit that is integrated with the telescopic driving motor. The ball screw mechanism acts to move an internal thread member in the front-rear direction of the vehicle, along an axial line of an external thread shaft member, by rotating the external thread shaft member. In this case, the ball screw mechanism acts to move the inner column in the front-rear direction of the vehicle with respect to the outer column. This adjusts the position of the steering shaft in the front-rear direction of the vehicle.

RELATED ART DOCUMENTS

Patent Documents

Patent Document 1: Japanese Unexamined Patent Application Publication No. 2019-172002 (JP 2019-172002 A)

SUMMARY OF THE INVENTION

Problem to be Solved by the Invention

The steering column device described in the above Patent Document 1 requires two driving motors and two ball screw mechanisms in order to adjust the position of the steering shaft in the up-down direction and the front-rear direction of the vehicle. However, from the perspective of improving installability thereof in the vehicle, simplifying the structure of the steering column device and reducing the size of build thereof is desired.

Means for Solving the Problem

A steering column device according to an aspect of the present disclosure includes a lower tube that is configured to be attached to a vehicle body so as to be pivotable in an up-down direction of a vehicle, a column shaft that is configured to receive attachment of a steering wheel of the vehicle, an upper tube that rotatably supports the column shaft and that also is attached to the lower tube so as to be movable in a front-rear direction of the vehicle, a motor for generating motor torque that is power for causing pivoting of the lower tube in the up-down direction and also movement of the upper tube in the front-rear direction, a link mechanism that couples the lower tube and the upper tube so as to be capable of moving in conjunction, and a power transmission mechanism that acts to transmit the motor torque to the link mechanism. The link mechanism is configured to act to cause the pivoting of the lower tube in the up-down direction and the movement of the upper tube in the front-rear direction to be performed in conjunction, when the motor torque is transmitted to the link mechanism by the power transmission mechanism.

BRIEF DESCRIPTION OF THE DRAWINGS

FIG. 4 is a sectional view illustrating surrounding configurations of a column shaft that the steering column device in FIG. 3 is equipped with.

FIG. 10 is a sectional view illustrating surrounding configurations of a column shaft that the steering column device in FIG. 9 is equipped with.

MODES FOR CARRYING OUT THE INVENTION

First Embodiment

A first embodiment will be described below with reference to FIG. 1 to FIG. 6.

Figure 1:
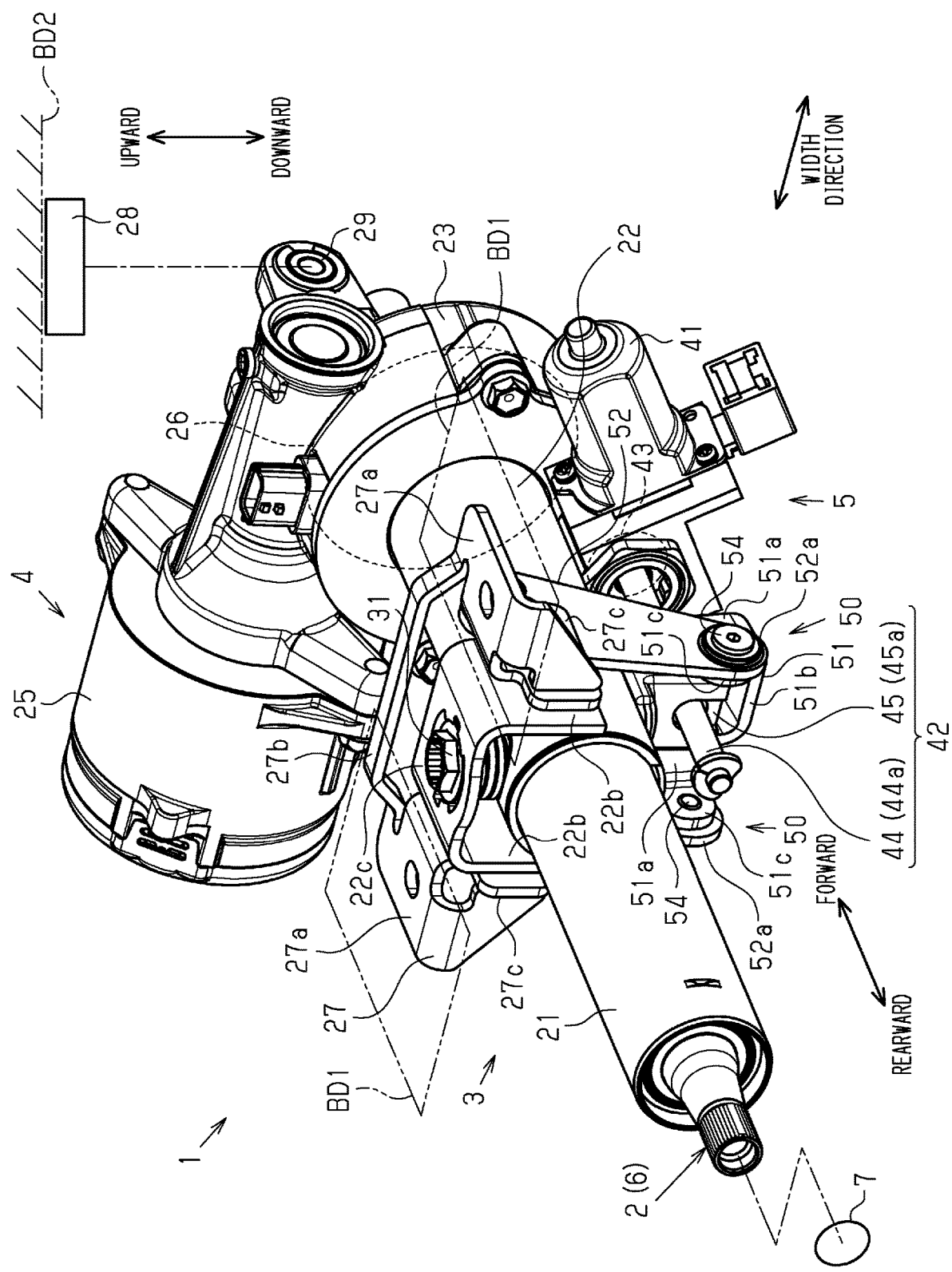
FIG. 1 is a perspective view of a steering column device according to a first embodiment.
Figure 2:
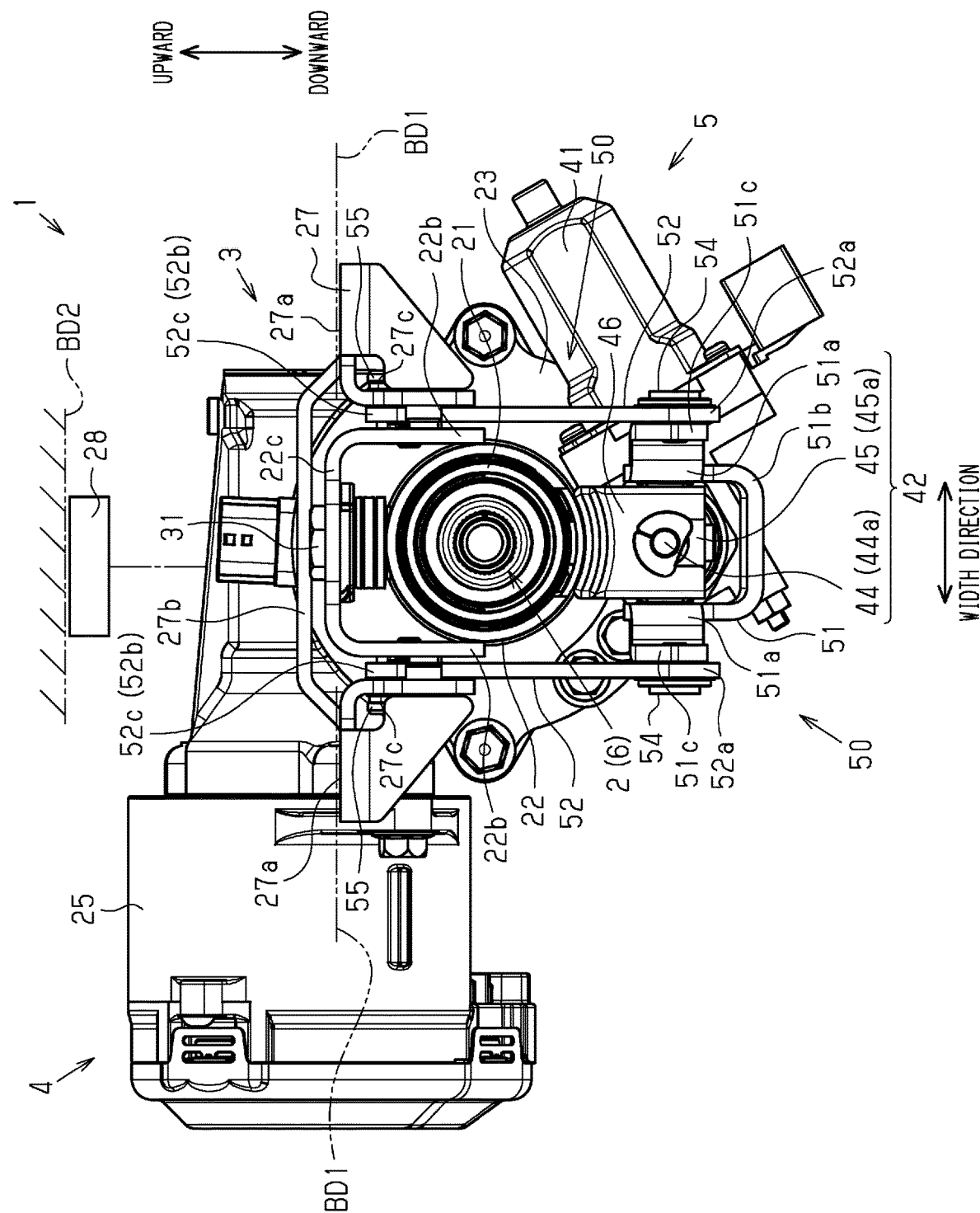
FIG. 2 is a frontal view of the steering column device in FIG. 1.
Figure 3:
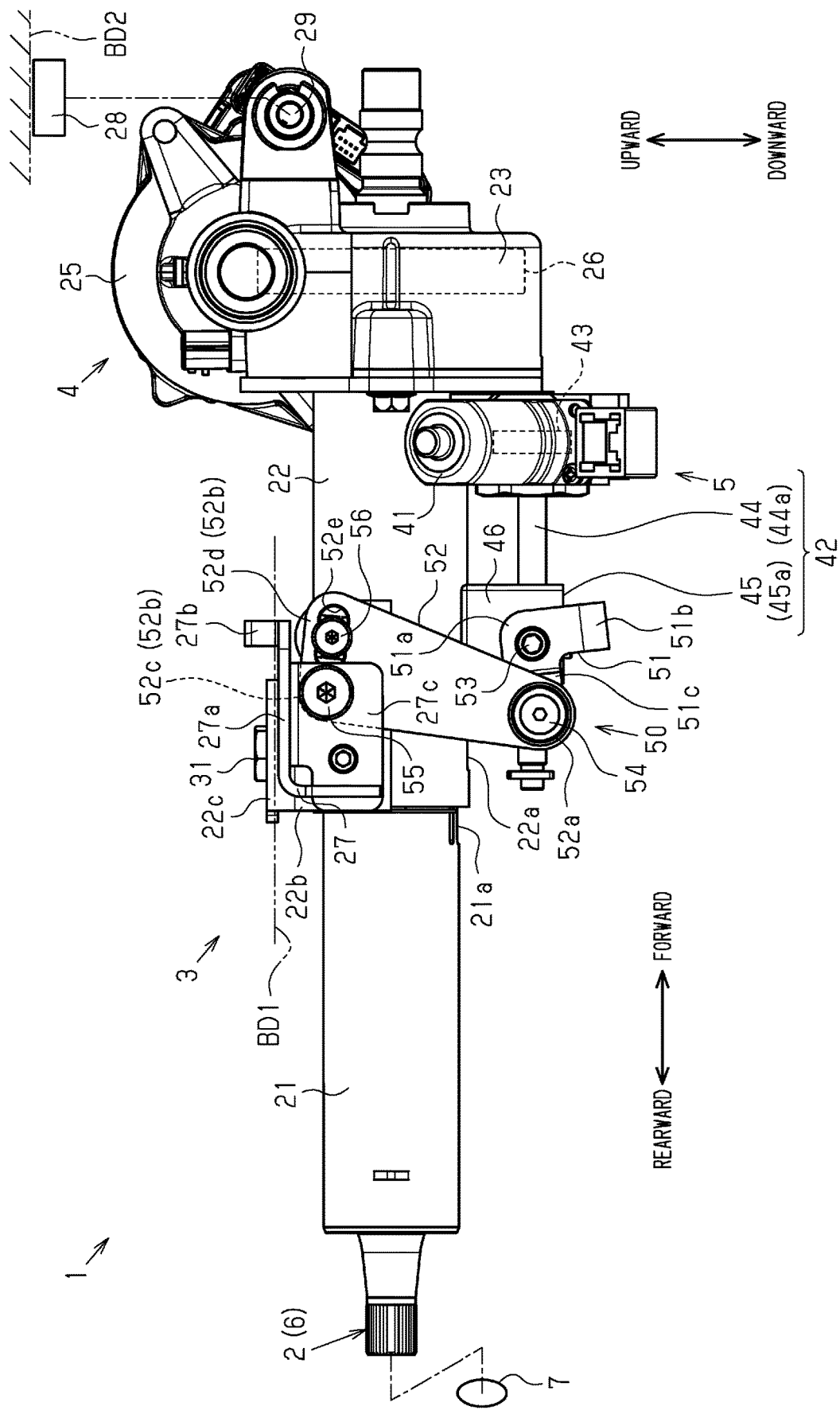
FIG. 3 is a side view of the steering column device in FIG. 1.

A steering column device 1 illustrated in FIG. 1 to FIG. 3 makes up a part of an electric power steering system installed in a vehicle, for example. The steering column device 1 is installed in the vehicle. The steering column device 1 is installed in the vehicle such that an axial line thereof extends in a front-rear direction of the vehicle. In FIG. 1, a left near side corresponds to a rear side of the vehicle, and also a right far side corresponds to a front side of the vehicle. In FIG. 2, a front side in the drawing corresponds to the rear side of the vehicle, and also a rear side in the drawing corresponds to a front side of the vehicle. In FIG. 3 the left side corresponds to the rear side of the vehicle, and also the right side corresponds to the front side of the vehicle. In FIG. 1 to FIG. 3, the upper side corresponds to an upper side of the vehicle, and also the lower side corresponds to a lower side of the vehicle. In the following description, orientations expressed in terms such as "front", "rear", "up", "down", and so forth, are defined with respect to the vehicle. A direction orthogonal to the "front-rear direction" and an "up-down direction" of the vehicle means a "width direction" of the vehicle.

<Steering Column Device>

As illustrated in FIG. 1 to FIG. 3, the steering column device 1 has a column shaft 2, a steering column 3, a steering actuator 4, and a position adjustment actuator 5. The column shaft 2 makes up part of a steering shaft 6. The steering column 3 rotatably supports the column shaft 2 internally. A first end of the column shaft 2, which is on a rear side thereof, is coupled to a steering wheel 7 of the vehicle. A second end of the column shaft 2, which is on a front side thereof, is coupled to an intermediate shaft that is omitted from illustration. The intermediate shaft makes up a power transmission path between the column shaft 2 and right and left steered wheels, omitted from illustration, of the vehicle. The column shaft 2, i.e., the steering shaft 6 rotates in conjunction with rotation of the steering wheel 7. Rotation of the steering shaft 6 is converted into reciprocating motion of a rack shaft in an axial direction thereof, via a rack-and-pinion mechanism that is omitted from illustration. The reciprocating motion of the rack shaft is transmitted to each of the right and left steered wheels, thereby changing steered angles of the steered wheels.

<Regarding Column Shaft>

Figure 4:
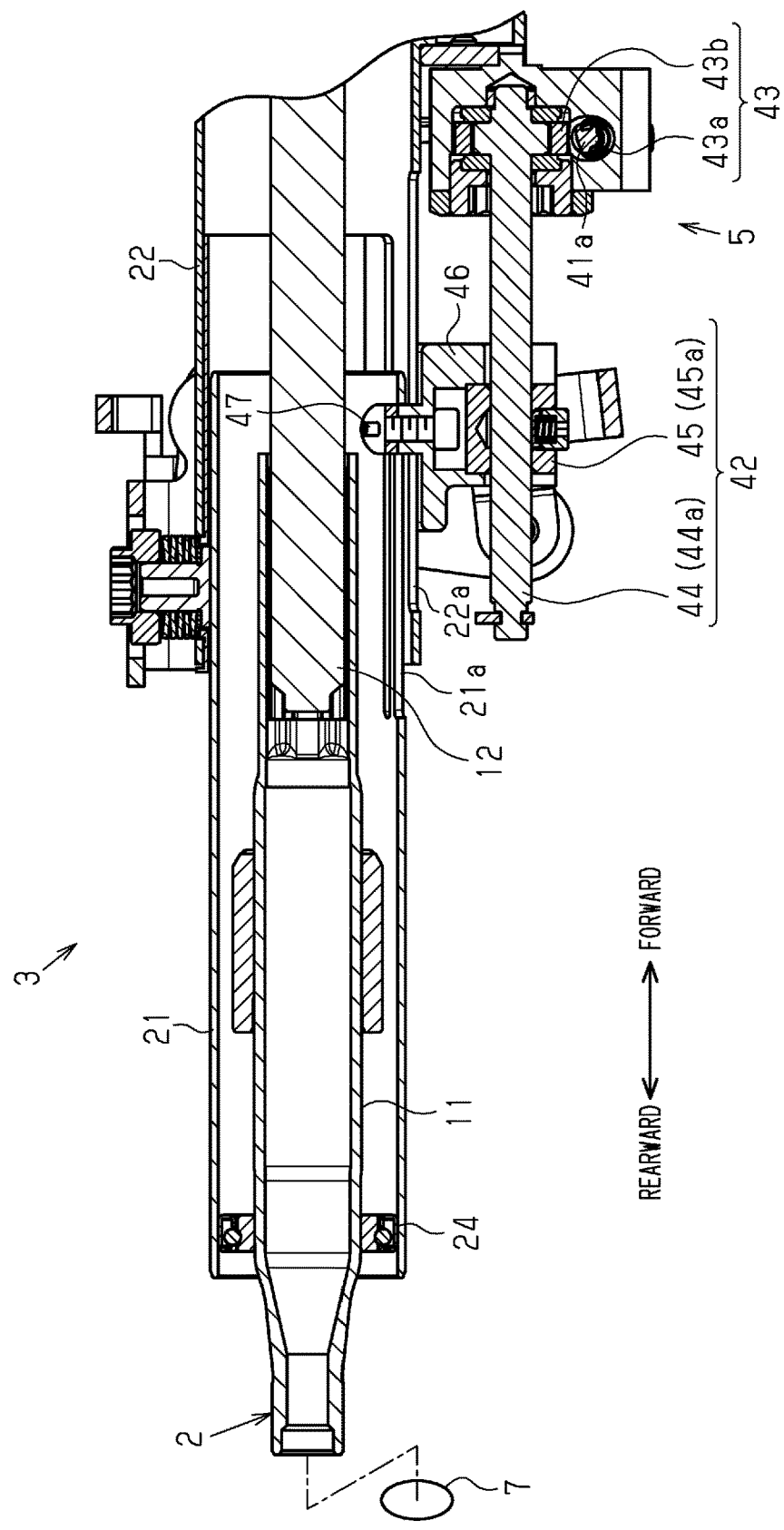

As illustrated in FIG. 4, the column shaft 2 has an upper shaft 11 and a lower shaft 12. Metal materials are used as the materials of each of the upper shaft 11 and the lower shaft 12. The shape of the upper shaft 11 is tubular. The shape of the lower shaft 12 is columnar. A first end of the upper shaft 11, which is on a rear side thereof, is coupled to the steering wheel 7. The lower shaft 12 is fitted to an inner peripheral portion of the upper shaft 11 at the second end on the front side. As a result, the upper shaft 11 and the lower shaft 12 are coupled with each other so as to be integrally rotatable, and capable of relative movement in the front-rear direction, which is the axial direction.

<Regarding Steering Column>

As illustrated in FIG. 1 to FIG. 3, the steering column 3 has an upper tube 21, a lower tube 22, and a housing 23. Metal materials are used as the materials of each of the upper tube 21, the lower tube 22, and the housing 23. The shape of each of the upper tube 21 and the lower tube 22 is cylindrical.

As illustrated in FIG. 4, the upper tube 21 and the lower tube 22 accommodate the upper shaft 11 and the lower shaft 12, i.e., the column shaft 2. The upper tube 21 rotatably supports the upper shaft 11, i.e., the column shaft 2, via a bearing 24. The first end of the upper shaft 11 protrudes from a first end of the upper tube 21 at a rear side thereof. A second end of the upper tube 21, at a front side thereof, is fitted to an inner peripheral portion of the lower tube 22. Thus, the upper tube 21 is coupled with the lower tube 22 so as to be capable of relative movement in the front-rear direction, which is the axial direction. The upper tube 21, i.e., the column shaft 2 is movable in the front-rear direction, i.e., in a so-called telescopic direction. The position of the steering wheel 7 in the front-rear direction is adjusted by the upper tube 21 moving in the telescopic direction.

The upper tube 21 has a slit 21a. The slit 21a is provided at a lower-side portion of the upper tube 21. The slit 21a is a through hole in a form of a slot that extends in the front-rear direction, which is the axial direction of the upper tube 21. The lower tube 22 has a slit 22a. The slit 22a is provided at a lower-side portion of the lower tube 22. The slit 22a is a through hole in the form of a slot that extends in the front-rear direction, which is the axial direction of the lower tube 22. The slit 21a and the slit 22a are arranged so as to overlap in a radial direction.

Returning to the description of FIG. 1 to FIG. 3, the lower tube 22 has a second end on a front side thereof, opposite to the first end to which the upper tube 21 is fitted. The housing 23 is coupled to the second end of the lower tube 22. A steering motor 25 is provided externally from the housing 23. A reduction mechanism 26 is accommodated internally in the housing 23. The reduction mechanism 26 reduces rotations of the steering motor 25, and transfers the reduced rotations to the lower shaft 12. In the present embodiment, the reduction mechanism 26 is a worm reducer that has a worm that is coupled to a rotation shaft of the steering motor 25 so as to be integrally rotatable, and a worm wheel. The steering motor 25 and the reduction mechanism 26 make up part of the steering actuator 4. The steering actuator 4 is accommodated in the housing 23, and also can be said to make up part of the steering column 3.

The steering column 3 has a column bracket 27 and a lower bracket 28. The column bracket 27 is fixed to a fixing portion BD1 of the vehicle body by, for example, a bolt and a nut screwed onto the bolt. The lower tube 22 is fixed to the fixing portion BD1 of the vehicle body via the column bracket 27. The lower bracket 28 is fixed to a fixing portion BD2 of the vehicle body by, for example, a bolt and a nut screwed onto the bolt. The housing 23 is fixed to the fixing portion BD2 of the vehicle body via the lower bracket 28.

The column bracket 27 has one or more bracket base portions 27a, a base coupling portion 27b, and one or more bracket plate portions 27c. The shape of the bracket base portion 27a is a flat plate shape. The bracket base portion 27a has a flat face that faces the fixing portion BD1 of the vehicle body. In the present embodiment, two bracket base portions 27a are disposed, one on either side of the lower tube 22 in the width direction. The shape of the base coupling portion 27b is an elongated plate shape. The base coupling portion 27b extends in the width direction above the lower tube 22. The base coupling portion 27b couples ends of the two bracket base portions 27a on front sides thereof, with each other. The shape of the bracket plate portion 27c is a flat plate shape. The bracket plate portion 27c has a flat face that faces the lower tube 22 in the width direction. In the present embodiment, one bracket plate portion 27c is provided for each of the two bracket base portions 27a. The two bracket plate portions 27c extend downward from edge portions of the two bracket base portions 27a that face each other in the width direction.

The lower tube 22 is attached to the column bracket 27 via one or more support plate portions 22b. The support plate portion 22b is integrally formed with the lower tube 22 by welding or the like, for example. The support plate portion 22b is provided at a first end of the lower tube 22 on a rear side thereof. The shape of the support plate portion 22b is a flat plate shape. The support plate portion 22b has a flat face that faces the lower tube 22 in the width direction. In the present embodiment, two support plate portions 22b are disposed, one on either side of the lower tube 22 in the width direction. A flat face of the support plate portion 22b on a side opposite to the lower tube 22 faces a flat face of the bracket plate portion 27c. The two support plate portions 22b are coupled to each other above the lower tube 22 by a support plate coupling portion 22c. The support plate coupling portion 22c has a tube pressing portion 31. The tube pressing portion 31 presses the upper tube 21 against the lower tube 22 using a biasing force of a spring or the like, for example. The tube pressing portion 31 suppresses backlash of the upper tube 21 when the upper tube 21 moves in the front-rear direction with respect to the lower tube 22.

The support plate portions 22b are coupled to the corresponding bracket plate portions 27c by a link mechanism 50. The support plate portions 22b are coupled to the corresponding bracket plate portions 27c so as to be pivotable in the up-down direction.

A first portion on a front side of the housing 23 has a tilt support shaft 29 that extends in the width direction. The housing 23 is attached to the lower bracket 28 by the tilt support shaft 29. The first end of the lower tube 22 that is provided with the support plate portion 22b is attached to the column bracket 27, so as to be pivotable in the up-down direction, about the tilt support shaft 29 serving as a center of turning. The lower tube 22, i.e., the column shaft 2 is pivotable in the up-down direction, i.e., in a so-called tilt direction. Pivoting the lower tube 22 in the tilt direction enables the height position of the steering wheel 7 in the up-down direction to be adjusted.

<Regarding Position Adjustment Actuator>

As illustrated in FIG. 1 to FIG. 3, the position adjustment actuator 5 has a position adjustment motor 41, a feed screw mechanism 42, and a reduction mechanism 43. The position adjustment motor 41 is provided externally from the housing 23. The feed screw mechanism 42 has a screw shaft 44 and a feed nut 45. The feed screw mechanism 42 may be, for example, a ball screw mechanism. The screw shaft 44 is disposed below the lower tube 22. In the present embodiment, the feed screw mechanism 42 is an example of a power transmission mechanism.

The screw shaft 44 extends further rearward from a second portion, which is a portion of the housing 23 on a rear side thereof. A thread groove 44a is formed on an outer peripheral portion of the screw shaft 44. The thread groove 44a extends over a range in which the slit 22a of the lower tube 22 extends in the axial direction.

The shape of the feed nut 45 is a cuboid. The feed nut 45 is disposed around the screw shaft 44. A thread groove 45a corresponding to the thread groove 44a of the screw shaft 44 is formed on an inner peripheral portion of the feed nut 45. The screw shaft 44 and the feed nut 45 are screwed together via their respective screw grooves 44a and 45a.

As illustrated in FIG. 4, the feed nut 45 is coupled to the lower portion of the upper tube 21 via a nut coupling portion 46. The nut coupling portion 46 is fixed to the feed nut 45. The nut coupling portion 46 is inserted inside the upper tube 21, via the slit 21a of the upper tube 21 and the slit 22a of the lower tube 22. The nut coupling portion 46 is fixed to a portion outside the slit 21a in the width direction, in a state of being inserted inside the upper tube 21. The nut coupling portion 46 is fixed to the upper tube 21 by a fastening member 47 such as a rivet or the like, for example. The feed nut 45 moves in the axial direction of the screw shaft 44 in conjunction with the rotation of the screw shaft 44. The feed nut 45 moves in the front-rear direction, which is the axial direction of the screw shaft 44, along with the upper tube 21.

When an external impact force that acts on the steering column device 1 exceeds a predetermined detachment load, the fixation between the nut coupling portion 46 and the upper tube 21 via the fastening member 47 is released. The nut coupling portion 46 inserted into the slit 21a of the upper tube 21 does not hinder movement of the upper tube 21. This enables the upper tube 21 to move rearward relative to the lower tube 22.

The reduction mechanism 43 reduces the rotations of the position adjustment motor 41, and transmits the reduced rotations to the screw shaft 44. In the present embodiment, the reduction mechanism 43 is a worm reduction mechanism having a worm 43a that is coupled to a rotation shaft 41a of the position adjustment motor 41 so as to be integrally rotatable, and a worm wheel 43b. The worm wheel 43b is fitted on the screw shaft 44. The worm wheel 43b is coupled to the screw shaft 44 so as to be integrally rotatable. The reduction mechanism 43 can be changed as appropriate, such as a belt-type reduction mechanism that has a belt for transmitting rotations of the position adjustment motor 41, or the like.

Motor torque of the position adjustment motor 41 is transmitted to the screw shaft 44 via the worm 43a and the worm wheel 43b, i.e., the reduction mechanism 43. The motor torque that is transmitted thus rotates the screw shaft 44. The motor torque of the position adjustment motor 41 is converted into power for rotating the screw shaft 44 and moving the feed nut 45 together with the upper tube 21 in the front-rear direction, i.e., in the telescopic direction.

<Regarding Link Mechanism>

As illustrated in FIG. 1 to FIG. 3, the link mechanism 50 has a nut link member 51 and one or more bracket link plates 52. The nut link member 51 couples the feed nut 45 and the bracket link plate 52 to each other. The bracket link plate 52 couples the nut link member 51, the lower tube 22, and the column bracket 27 to each other.

The nut link member 51 has one or more nut link plate portions 51a, and a nut link coupling portion 51b. The shape of the nut link plate portion 51a is a flat plate shape. The nut link plate portion 51a has a flat face that faces the feed nut 45 in the width direction. In the present embodiment, two nut link plate portions 51a are disposed, one on either side of the feed nut 45 in the width direction. Second ends on lower sides of the two nut link plate portions 51a are coupled to each other by the nut link coupling portion 51b. The nut link plate portion 51a has a nut link distal end portion 51c that is a first end and that extends in a direction perpendicular to the second end thereof. The nut link plate portion 51a is coupled to the feed nut 45 by a fastening member 53 such as a rivet or the like, for example. The nut link plate portion 51a and the feed nut 45 are relatively turnable with the fastening member 53 as the center of turning.

The shape of the bracket link plate 52 is an elongated long plate shape. The bracket link plate 52 has a flat face that faces both the lower tube 22 and the nut link plate portion 51a in the width direction. In this embodiment, two bracket link plates 52 are disposed, one on either side of the lower tube 22 and the feed nut 45 in the width direction. Each bracket link plate 52 has a nut-side end portion 52a that faces the corresponding nut link plate portion 51a in the width direction. The nut-side end portion 52a is coupled to the corresponding nut link distal end portion 51c by a fastening member 54 such as a rivet or the like, for example. Each bracket link plate 52 and the nut link distal end portion 51c corresponding thereto are relatively turnable around the fastening member 54 as the center of turning.

Each bracket link plate 52 has a tube-side end portion 52b facing the lower tube 22 in the width direction. The tube-side end portion 52b has a covered portion 52c that is covered in the width direction by the column bracket 27, and an exposed portion 52d that is exposed in the width direction by the column bracket 27. Each covered portion 52c is coupled to the corresponding bracket plate portion 27c by a fastening member 55 such as a rivet or the like, for example. Each bracket link plate 52 and the bracket plate portion 27c corresponding thereto are relatively turnable around the fastening member 55 as the center of turning.

Each exposed portion 52d is coupled to the corresponding support plate portion 22b by a fastening member 56 such as a rivet or the like, for example. Each bracket link plate 52 and the support plate portion 22b corresponding thereto are relatively turnable around the fastening member 56 as the center of turning. Each exposed portion 52d has a guide hole 52e for moving the position of the center of relative turning between the bracket link plate 52 and the support plate portion 22b. In the present embodiment, the guide hole 52e is a through hole that extends from the covered portion 52c to the exposed portion 52d.

Actions of the feed nut 45 are converted into actions of the lower tube 22 with respect to the column bracket 27, via the nut link member 51 and the bracket link plate 52. For example, when the feed nut 45 moves from the front side toward the rear side, the bracket link plate 52 can turn in the clockwise direction with respect to the nut link distal end portion 51c, about the fastening member 54 in FIG. 3 as the center of turning. At the same time, the bracket link plate 52 can turn in the clockwise direction with respect to the bracket plate portion 27c with the fastening member 55 as the center of turning in FIG. 3, and can also turn in the clockwise direction with respect to the support plate portion 22b with the fastening member 56 as the center of turning. In other words, the motor torque of the position adjustment motor 41 causes actions of the nut link member 51 and the bracket link plate 52, and thereby is converted into power for pivoting the lower tube 22 in the up-down direction, i.e., in the tilt direction, with respect to the column bracket 27.

<Regarding Action of Link Mechanism>

The position adjustment motor 41 is connected to a motor control device 60, for example. A position adjustment lever 70 is connected to the motor control device 60. The motor control device 60 controls actions of the position adjustment motor 41 based on lever operations that are operations performed by a driver with regard to the position adjustment lever 70. The motor control device 60 controls actions of the position adjustment motor 41 so as to generate motor torque for rotating the screw shaft 44 in a first direction in response to forward operation of the position adjustment lever 70. The first direction is a direction for moving the feed nut 45 forward, which is a direction of approaching the housing 23. The motor control device 60 controls the actions of the position adjustment motor 41 so as to generate motor torque for rotating the screw shaft 44 in a second direction that is the opposite direction to the first direction, in response to rearward operation of the position adjustment lever 70. The second direction is a direction for moving the feed nut 45 rearward, which is a direction of receding from the housing 23.

Figure 5A:
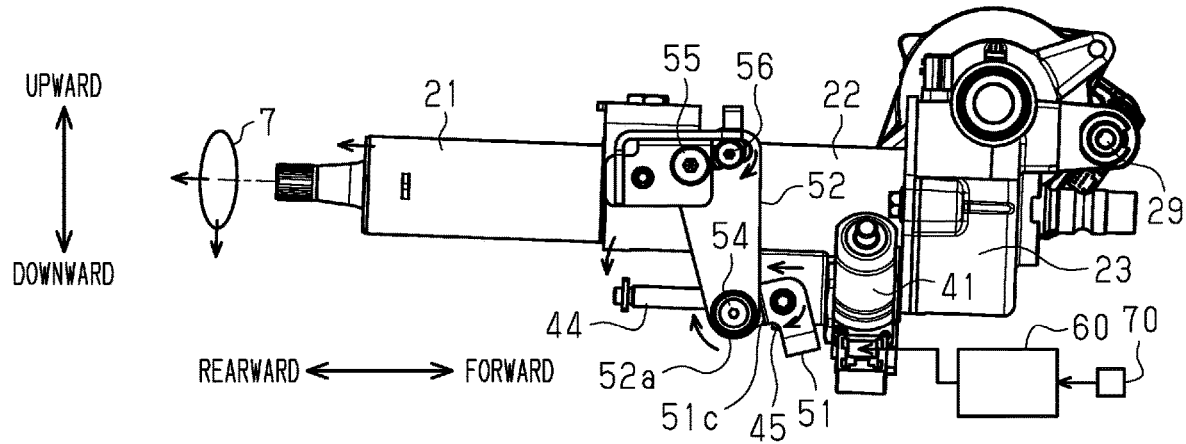
FIG. 5A to FIG. 5C are diagrams for describing actions of a link mechanism in the steering column device in FIG. 3.

The state illustrated in FIG. 5A is a state in which the feed nut 45 comes closest to the position adjustment motor 41, i.e., the housing 23. The nut link member 51 is in a state in which the nut link distal end portion 51c is positioned at a most downward position. The bracket link plate 52 is in a state in which the nut-side end portion 52a is positioned most forward. In this case, the bracket link plate 52 has the largest dimension in the up-down direction and the smallest dimension in the front-rear direction. The fastening member 54 and the fastening member 56 are in a state in which the positions thereof in the front-rear direction are approximately aligned. The fastening member 56 is positioned upward from the fastening member 55. The upper tube 21 has moved most forward, and the lower tube 22 has moved most upward. The steering wheel 7 is in a state of being adjusted to the most forward position in the front-rear direction and also to the most upward position in the up-down direction. The state of the steering column 3 at this time will be referred to as a first state in the following description.

In the first state, the position adjustment motor 41 rotates the screw shaft 44 by motor torque generated by rotation in the first direction. The feed nut 45 moves rearward, which is the direction of receding away from the housing 23, in conjunction with the rotation of the screw shaft 44. The nut link member 51 turns in conjunction with the movement of the feed nut 45, such that the nut link distal end portion 51c moves upward. The bracket link plate 52 turns in conjunction with the movement of the feed nut 45 and the turning of the nut link member 51, such that the nut-side end portion 52a moves rearward. In this case, the bracket link plate 52 is inclined such that the dimension in the up-down direction decreases and the dimension in the front-rear direction increases. The position of the fastening member 54 and the position of the fastening member 56 change in the front-rear direction. The fastening member 56 moves downward so as to come closer to the fastening member 55 in the up-down direction. Thus, the upper tube 21 moves rearward in conjunction with the movement of the feed nut 45, and also the lower tube 22 moves downward in conjunction with the movement of the feed nut 45. The position of the steering wheel 7 is adjusted to move rearward and also to move downward. Thereafter, the position adjustment motor 41 maintains rotation in the first direction, so as to rotate the screw shaft 44, and as a result, the feed nut 45 is in a state of having moved to approximately the middle of the movable range of the screw shaft 44 in the axial direction. The state of the steering column 3 at this time will be referred to as an intermediate state in the following description.

Figure 5B:
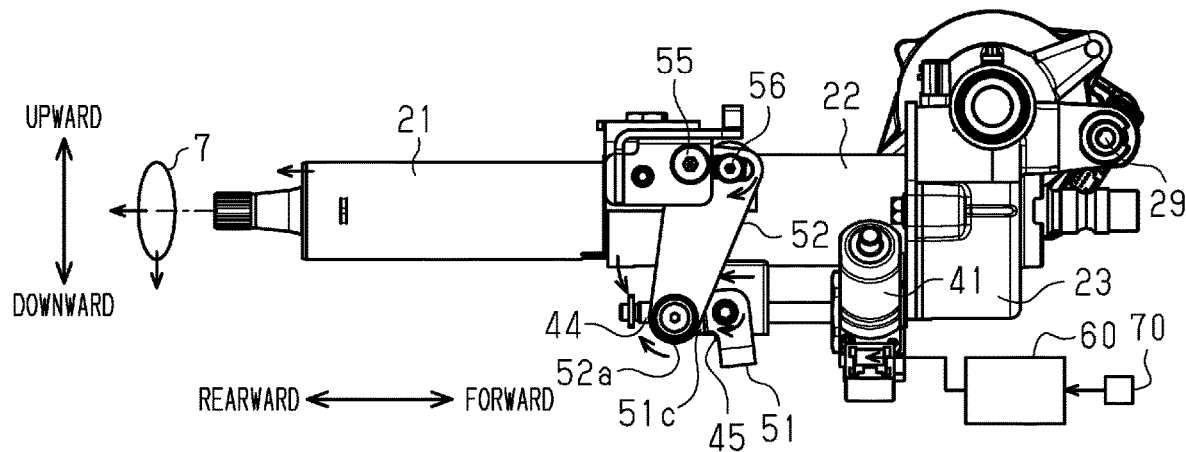

In the intermediate state, as illustrated in FIG. 5B, the nut link member 51 is in a state in which the position of the nut link distal end portion 51c is approximately aligned with the position of the screw shaft 44 in the up-down direction. The bracket link plate 52 is in a state in which the nut-side end portion 52a is located rearward from the tube-side end portion 52b. In this case, the position of the fastening member 56 is approximately aligned with the position of the fastening member 55 in the up-down direction. The upper tube 21 has moved to approximately the middle of the movable range in the front-rear direction, and also the lower tube 22 has moved to approximately the middle of the movable range in the up-down direction. The steering wheel 7 is in a state of being adjusted to approximately the middle position in the front-rear direction and also to approximately the middle position in the up-down direction.

In the intermediate state, the position adjustment motor 41 further rotates the screw shaft 44 by motor torque generated by rotation in the first direction. The feed nut 45 moves further rearward, which is the direction of receding away from the housing 23, in conjunction with the rotation of the screw shaft 44. The nut link member 51 turns in conjunction with the movement of the feed nut 45, such that the nut link distal end portion 51c moves to above the screw shaft 44. The bracket link plate 52 turns in conjunction with the movement of the feed nut 45 and the turning of the nut link member 51, such that the nut-side end portion 52a moves further rearward. In this case, the bracket link plate 52 is inclined such that the dimension in the up-down direction further decreases and also the dimension in the front-rear direction further increases. The position of the fastening member 54 and the position of the fastening member 56 deviate even more greatly in the front-rear direction. The fastening member 56 moves downward from the fastening member 55. Accordingly, the upper tube 21 moves further rearward in conjunction with the movement of the feed nut 45, and also the lower tube 22 moves further downward in conjunction with the movement of the feed nut 45. The position of the steering wheel 7 is adjusted to move further rearward and also to move further downward. Thereafter, the position adjustment motor 41 maintains rotation in the first direction so as to rotate the screw shaft 44, and as a result, the feed nut 45 is in a state of being moved farthest away from the housing 23. The state of the steering column 3 at this time will be referred to as a second state in the following description.

Figure 5C:
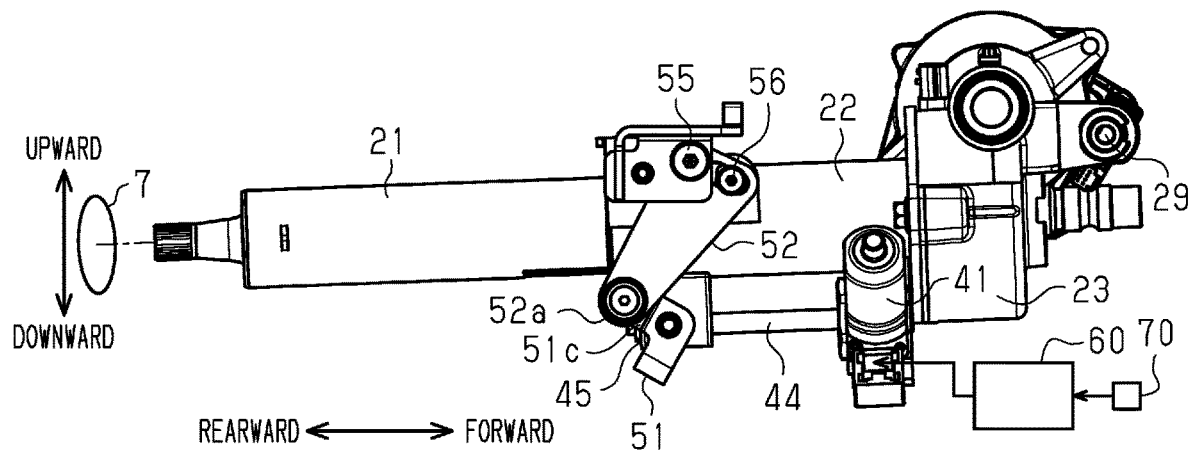

In the second state, as illustrated in FIG. 5C, the nut link member 51 is in a state in which the nut link distal end portion 51c thereof is positioned most upward. The bracket link plate 52 is in a state in which the nut-side end portion 52a is positioned most rearward. In this case, the bracket link plate 52 is in a state of having the smallest dimension in the up-down direction and also the largest dimension in the front-rear direction. The fastening member 54 and the fastening member 56 are in a state in which the positional deviation in the up-down direction is the greatest. The fastening member 56 is positioned downward from the fastening member 55. The upper tube 21 has moved most rearward, and also the lower tube 22 has moved most downward. The steering wheel 7 is in a state of being adjusted to the most forward position in the front-rear direction and also to the most upward position in the up-down direction.

In the second state, the position adjustment motor 41 rotates the screw shaft 44 by motor torque generated by rotation in the second direction. The feed nut 45 moves forward to a position closest to the housing 23 in conjunction with the rotation of the screw shaft 44. The nut link member 51 turns in conjunction with the movement of the feed nut 45, such that the nut link distal end portion 51c moves to the most downward position. The bracket link plate 52 turns in conjunction with the movement of the feed nut 45 and the turning of the nut link member 51, such that the nut-side end portion 52a moves to the most forward position. In this case, the bracket link plate 52 is erected so as to have the largest dimension in the up-down direction and the smallest dimension in the front-rear direction. The position of the fastening member 54 and the position of the fastening member 56 change in the front-rear direction. The fastening member 56 rises to approach the fastening member 55 in the up-down direction, and then moves above the fastening member 55. Thus, the upper tube 21 moves to the most forward position in conjunction with the movement of the feed nut 45 and the lower tube 22 moves to the most upward position in conjunction with the movement of the feed nut 45. The steering wheel 7 is in a state of being adjusted to the most forward position in the front-rear direction and also to the most upward position in the up-down direction. That is to say, the state of the steering column 3 changes from the second state to the first state through the intermediate state.

According to the present embodiment, the position adjustment motor 41 causes action of the link mechanism 50 via the feed screw mechanism 42. When the motor torque is transmitted to the link mechanism 50, the link mechanism 50 acts so that the pivoting of the lower tube 22 in the tilt direction and the movement of the upper tube 21 in the telescopic direction are in conjunction. Thus, the up-down direction position and the front-rear direction position of the steering wheel 7 can be adjusted at once.

Figure 6:
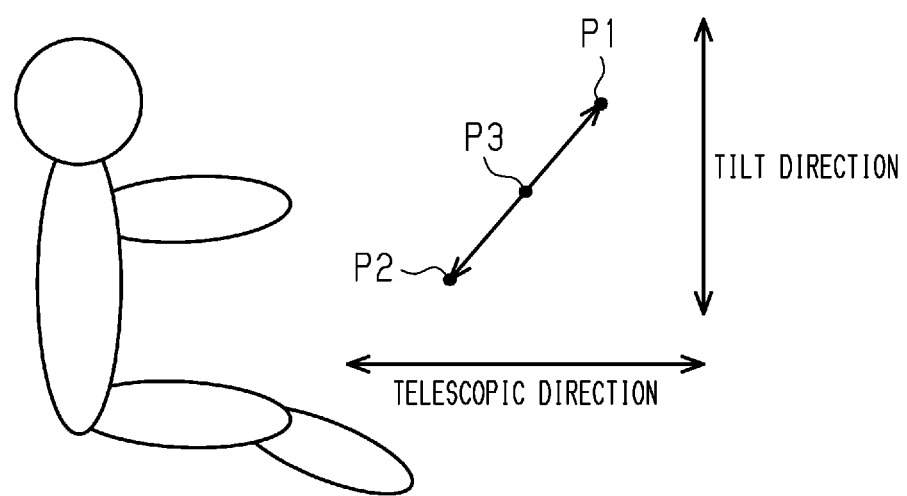
FIG. 6 is a diagram for describing a path that positions of the steering wheel follow in accordance with the actions of the link mechanism in FIG. 5.

In FIG. 6, the direction along the horizontal axis is the telescopic direction and the direction along the vertical axis is the tilt direction. Regarding the position of the steering wheel 7, the starting point will be assumed to be position P1 corresponding to the first state in FIG. 5A, and the ending point to be position P2 corresponding to the second state in FIG. 5C. In this case, the position of the steering wheel 7 moves in the tilt direction while moving in the telescopic direction from position P1 to position P2 along a first path defined in a two-dimensional plane. Regarding the position of the steering wheel 7, the starting point will be assumed to be the position P2 corresponding to the second state in FIG. 5C, and the ending point to be the position P1 corresponding to the first state in FIG. 5A. In this case, the position of the steering wheel 7 moves in the tilt direction while moving in the telescopic direction from position P2 to position P1 along a second path defined in the two-dimensional plane. The first path and the second path both pass through position P3, which corresponds to the intermediate state of FIG. 5B. The first path and the second path are the same as each other, regardless of which of position P1 and position P2 is the starting point or the ending point.

Thus, the link mechanism 50 couples the upper tube 21 and the lower tube 22 so as to be in conjunction. Regarding the position of the steering wheel 7, when a position in one of the up-down direction and the front-rear direction is determined, the position in the other of the up-down direction and the front-rear direction is determined. That is to say, the position of the steering wheel 7 is adjusted in conjunction with the up-down direction position and the front-rear direction position. Regarding adjustment of the position of the steering wheel 7, the position adjustment motor 41 and the feed screw mechanism 42 can be shared between the mechanism for adjusting the up-down direction position and the mechanism for adjusting the front-rear direction position.

Effects of First Embodiment (1-1) Regarding adjustment of the position of the steering wheel 7, the position adjustment motor 41 and the feed screw mechanism 42 can be shared between the mechanism for adjusting the position in the up-down direction and the mechanism for adjusting the position in the front-rear direction, thereby simplifying the structure of the steering column device 1 and also reducing the size of the build thereof. Accordingly, the installability of the steering column device 1 in the vehicle can be improved.

(1-2) Regarding adjustment of the position of the steering wheel 7, in addition to the position adjustment motor 41 and the feed screw mechanism 42, the reduction mechanism 43 can also be shared between the mechanism for adjusting the position in the up-down direction and the mechanism for adjusting the position in the front-rear direction. Thus, the configuration of the steering column device 1 is further simplified, and also the size of the build is further reduced. Accordingly, the installability of the steering column device 1 in the vehicle can be further improved.

(1-3) The feed screw mechanism 42 requires space extending in the front-rear direction, for disposing the screw shaft 44 and for moving the feed nut 45. With respect to this point, in the present embodiment, the feed screw mechanism 42 is shared between the mechanism for adjusting the position in the up-down direction and the mechanism for adjusting the position in the front-rear direction, regarding adjustment of the position of the steering wheel 7, and accordingly space required for the screw shaft 44 and the feed nut 45 can be halved as compared to a case without sharing. This is effective in improving the installability of the steering column device 1 in the vehicle.

(1-4) The link mechanism 50 is not coupled with the upper tube 21, and the feed nut 45 is coupled with the upper tube 21 and the link mechanism 50. Thus, in a configuration in which the upper tube 21 is fitted to the inner peripheral portion of the lower tube 22, the upper tube 21 can be smoothly moved in the front-rear direction. When adopting a configuration in which the upper tube 21 is fitted to the inner peripheral portion of the lower tube 22, this arrangement is effective in smooth pivoting of the lower tube 22 in the up-down direction and moving of the upper tube 21 in the front-rear direction in conjunction.

(1-5) The motor control device 60 can be configured to control the actions of the position adjustment motor 41 so that the state of the steering column 3 is the first state when the driver exits the vehicle, for example. Also, the motor control device 60 can be configured to control the actions of the position adjustment motor 41 so that the steering column 3 is in the second state or an optional state when the driver enters the vehicle, for example. The optional state is a state between the first state and the second state, and is a state that the driver can set and store in advance.

In this case, when the driver exits the vehicle, the steering wheel 7 can be adjusted to the first state. On the other hand, when the driver enters the vehicle, the steering wheel 7 can be adjusted to the optional state. In this regard, when the position in the up-down direction and the position in the front-rear direction of the steering wheel 7 can be adjusted at once, adjustment to the desired position can be quickly completed. Accordingly, convenience for the driver when exiting the vehicle or entering the vehicle can be enhanced.

Second Embodiment

Next, a second embodiment will be described with reference to FIG. 7 to FIG. 11. Note that for convenience of description, components that are the same as those in the first embodiment are denoted by the same signs as those in the first embodiment, and description thereof will be omitted.

Figure 7:
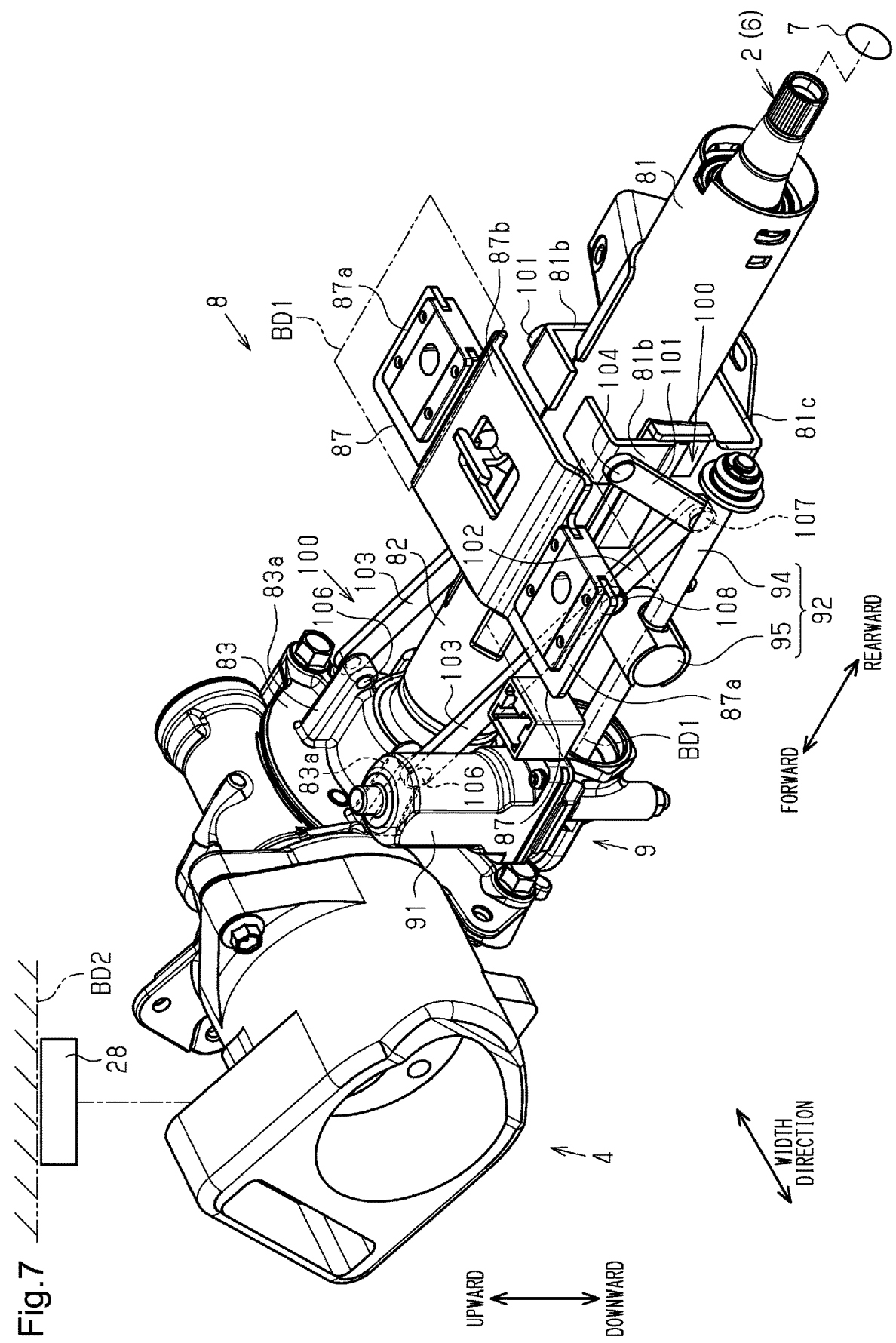
FIG. 7 is a perspective view of a steering column device according to a second embodiment.
Figure 8:
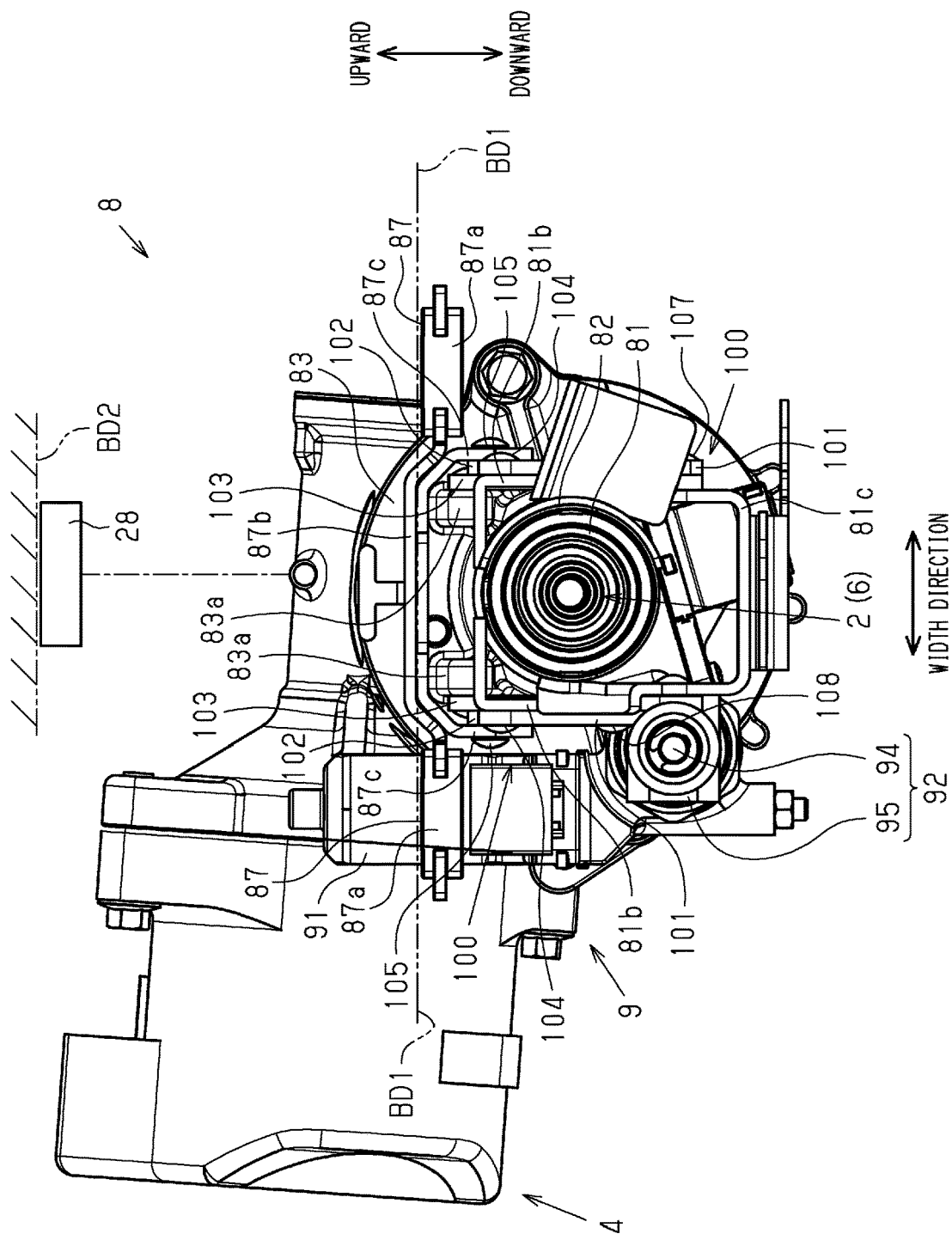
FIG. 8 is a frontal view of the steering column device in FIG. 7.
Figure 9:
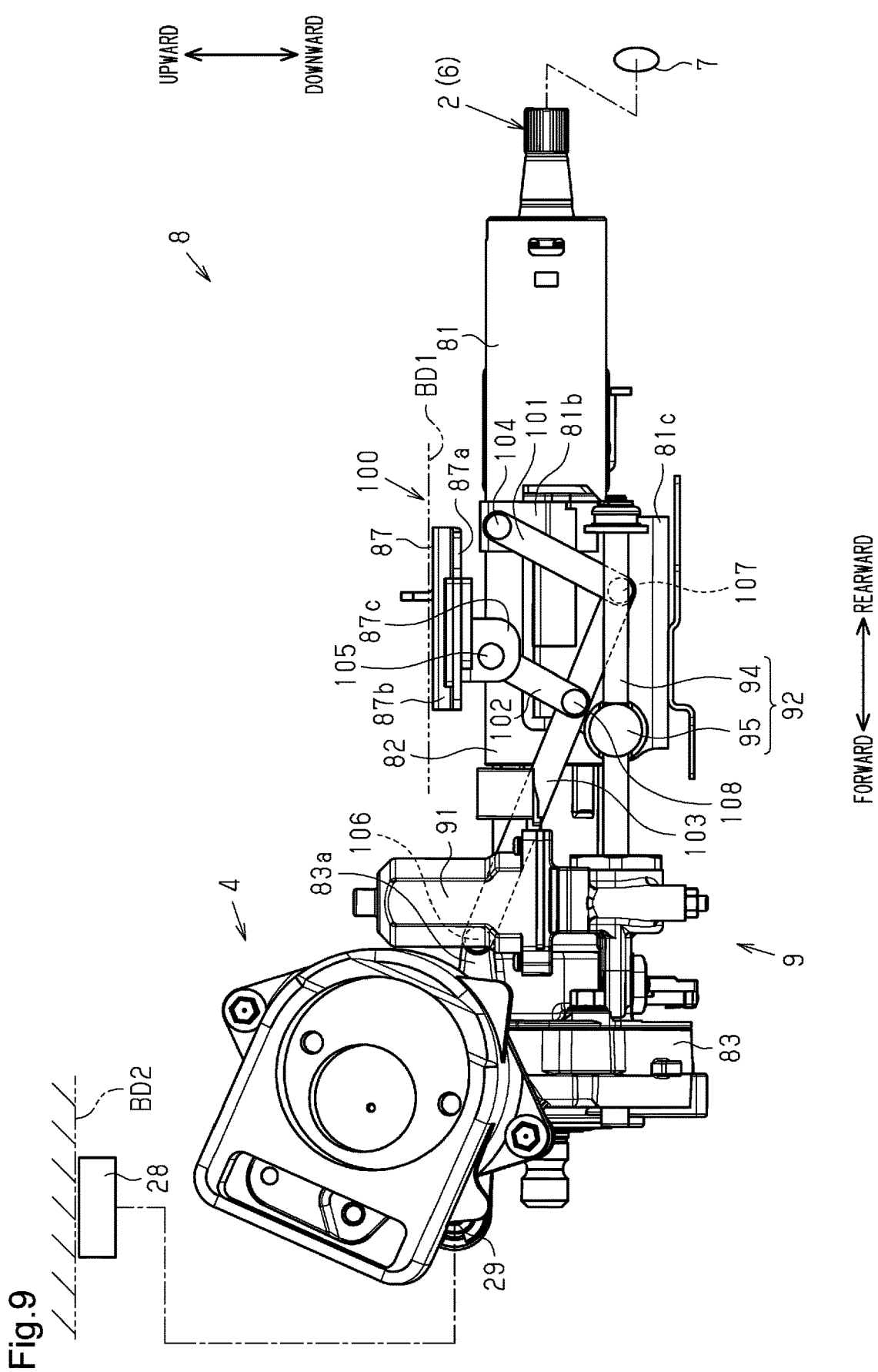
FIG. 9 is a side view of the steering column device in FIG. 7.
Figure 10:
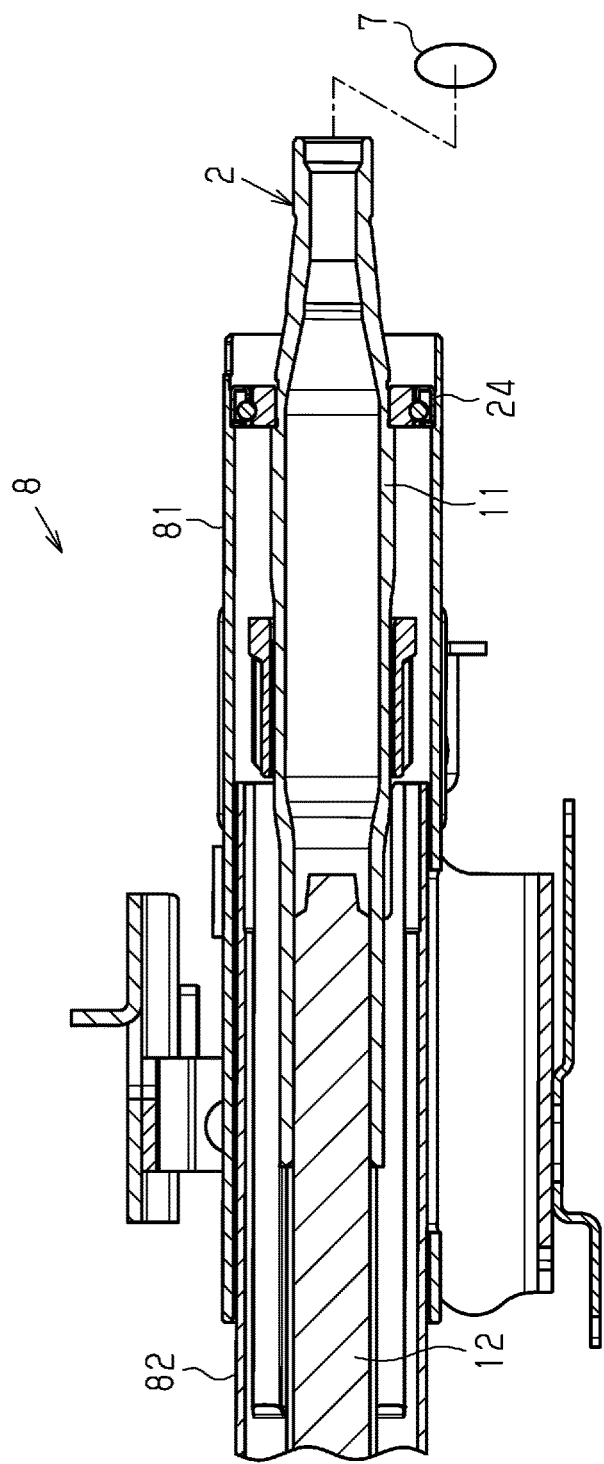

As illustrated in FIG. 7 to FIG. 9, the steering column 8 differs from the first embodiment with respect to the point that a lower tube 82 is fitted to an inner peripheral portion of an upper tube 81, whereas the upper tube 21 according to the first embodiment is fitted to the inner peripheral portion of the lower tube 22. A configuration of coupling the steering column 8 to a column bracket 87 is different from that of the first embodiment. A configuration of a link mechanism 100 differs from that of the first embodiment.

<Regarding Steering Column>

As illustrated in FIG. 7 to FIG. 10, the steering column 8 has the upper tube 81, the lower tube 82, and a housing 83. The housing 83 is provided at a second end on a front side of the lower tube 82. A first end of the lower tube 82, at a rear side thereof, is fitted to the inner peripheral portion of the upper tube 81.

The upper tube 81 is fixed to the fixing portion BD1 of the vehicle body via the column bracket 87. The column bracket 87 has one or more bracket base portions 87a, a base coupling portion 87b, and one or more bracket plate portions 87c. The shape of the bracket base portion 87a is a flat plate shape. The bracket base portion 87a has a flat face that faces the fixing portion BD1 of the vehicle body. In the present embodiment, two bracket base portions 87a are disposed, one on either side of the upper tube 81 in the width direction. The shape of the base coupling portion 87b is an elongated plate shape. The base coupling portion 87b extends in the width direction above the upper tube 81. The base coupling portion 87b couples the two bracket base portions 87a with each other. The shape of the bracket plate portion 87c is a flat plate shape. The bracket plate portion 87c has a flat face that faces the upper tube 81 in the width direction. In the present embodiment, one bracket plate portion 87c is provided to each of the two bracket base portions 87a. The two bracket plate portions 87c extend downward from edge portions of the two bracket base portions 87a that face each other in the width direction.

The upper tube 81 is attached to the column bracket 87 via one or more support plate portions 81b. The support plate portion 81b is integrally formed with the upper tube 81 by welding or the like, for example. The shape of the support plate portion 81b is a flat plate shape. The support plate portion 81b has a flat face that faces the upper tube 81 in the width direction. In the present embodiment, two support plate portions 81b are disposed, one on either side of the upper tube 81 in the width direction. The support plate portions 81b are coupled to each other below the upper tube 81 by a support plate coupling portion 81c.

The support plate portions 81b are coupled to the corresponding bracket plate portions 87c by the link mechanism 100. The support plate portions 81b are coupled to the corresponding bracket plate portions 87c so as to be pivotable in the up-down direction.

A second portion on a rear side of the housing 83 is provided with one or more link attachment portions 83a. The shape of the link attachment portion 83a is columnar. The link attachment portion 83a extends rearward from the second portion of the housing 83. In the present embodiment, two link attachment portions 83a are disposed, one on either side of the lower tube 82 in the width direction. The link attachment portions 83a are coupled to the corresponding bracket plate portions 87c by the link mechanism 100.

The lower tube 82 is attached to the column bracket 87 via the upper tube 81 and the link mechanism 100. A first portion of the lower tube 82 that is provided with the upper tube 81 is attached to the column bracket 87, so as to be pivotable in the up-down direction, about the tilt support shaft 29 serving as a center of turning.

<Regarding Position Adjustment Actuator>

As illustrated in FIG. 7 to FIG. 9, a position adjustment motor 91 of a position adjustment actuator 9 is provided externally from the housing 83. A screw shaft 94 of a feed screw mechanism 92 is disposed on a first side, which is one side in the width direction of the upper tube 81 and the lower tube 82. In the present embodiment, the first side is the same as the side on which the steering actuator 4 is provided. The screw shaft 94 extends further rearward from the second portion of the housing 83.

The shape of the feed nut 95 of the feed screw mechanism 92 is columnar. The feed nut 95 is disposed around the screw shaft 94. The feed nut 95 is fixed to the support plate portion 81b provided on the first side of the upper tube 81. The feed nut 95 is integrally formed with the support plate portion 81b by welding or the like, for example. The feed nut 95 moves in the axial direction of the screw shaft 94 in conjunction with the rotation of the screw shaft 94. The feed nut 95 moves in the front-rear direction, which is the axial direction of the screw shaft 94, along with the upper tube 81.

When an external impact force that acts on the steering column device 1 exceeds a predetermined detachment load, the fixation of the support plate portion 81b to the upper tube 81, or the fixation of the feed nut 95 to the support plate portion 81b, is released. This enables the upper tube 81 to move rearward relative to the lower tube 82.

<Regarding Link Mechanism>

As illustrated in FIGS. 7 to 9, the link mechanism 100 has one or more first link members 101, one or more second link members 102, and one or more third link members 103. The shape of the first link member 101 is an elongated long plate shape. The first link member 101 has a flat face facing the support plate portion 81b in the width direction. In the present embodiment, two first link members 101 are disposed, one on either side of the upper tube 81 in the width direction.

A first end of each first link member 101 is coupled to the corresponding support plate portion 81b. Each first link member 101 is coupled to the corresponding support plate portion 81b by a fastening member 104 such as a rivet or the like, for example. The first link member 101 and the support plate portion 81b are relatively turnable about the fastening member 104 serving as a center of turning. A second end of each first link member 101 is coupled to the corresponding third link member 103.

The shape of the second link member 102 is an elongated long plate shape. The dimension of the long sides of the second link member 102 is smaller than the dimension of the long sides of the first link member 101. The second link member 102 has a flat face facing both the upper tube 81 and the column bracket 87 in the width direction. In the present embodiment, two second link members 102 are disposed, one on either side of the upper tube 81 in the width direction. A first end of each second link member 102 is coupled to the corresponding bracket plate portion 87c.

Each second link member 102 is coupled to the corresponding bracket plate portion 87c by a fastening member 105 such as a rivet or the like, for example. The second link member 102 and the bracket plate portion 87c are relatively turnable about the fastening member 105 serving as a center of turning. A second end of each second link member 102 is coupled to the corresponding third link member 103.

The shape of the third link member 103 is an elongated long plate shape. The dimension of the long sides of the third link member 103 is larger than the dimension of the long sides of the first link member 101. The third link member 103 has a flat face facing both the upper tube 81 and the lower tube 82 in the width direction. In the present embodiment, two third link members 103 are disposed, one on either side of the upper tube 81 and the lower tube 82 in the width direction.

A second end of each third link member 103 is coupled to the corresponding link attachment portion 83a. Each third link member 103 is coupled to the corresponding link attachment portion 83a by a fastening member 106 such as a rivet or the like, for example. The third link member 103 and the link attachment portion 83a are relatively turnable about the fastening member 106 serving as a center of turning. A first end of each third link member 103 is coupled to the second end of the corresponding first link member 101. Each third link member 103 is coupled to the corresponding first link member 101 by a fastening member 107 such as a rivet or the like, for example. The third link member 103 and the first link member 101 are relatively turnable about the fastening member 107 serving as a center of turning. An intermediate portion between the first end and the second end of each third link member 103 is coupled to the second end of the corresponding second link member 102. The intermediate portion to which the second link member 102 is coupled is a portion closer to the first end side than the middle between the first end and the second end of the third link member 103. The intermediate portion of each third link member 103 is coupled to the corresponding second link member 102 by a fastening member 108 such as a rivet or the like, for example. The third link member 103 and the second link member 102 are relatively turnable about the fastening member 108 serving as a center of turning.

The actions of the feed nut 95 are converted into actions of the lower tube 82 with respect to the column bracket 87, via the first link member 101, the second link member 102, and the third link member 103. For example, when the feed nut 95 moves from the front side toward the rear side, the first link member 101 can turn in the clockwise direction with respect to the support plate portion 81b, about the fastening member 104 in FIG. 9 as the center of turning. At the same time, the third link member 103 can turn in the counterclockwise direction with respect to the first link member 101 with the fastening member 107 in FIG. 9 as the center of turning, and also can turn in the counterclockwise direction with respect to the link attachment portion 83a with the fastening member 106 as the center of turning. At the same time, the second link member 102 can turn in the clockwise direction with respect to the third link member 103 with the fastening member 108 in FIG. 9 as the center of turning, and also can turn in the clockwise direction with respect to the bracket plate portion 87c with the fastening member 105 as the center of turning. That is to say, the motor torque of the position adjustment motor 91 causes actions of the first link member 101, the second link member 102, and the third link member 103, and thereby is converted into power for pivoting the lower tube 82 in the up-down direction, i.e., in the tilt direction, with respect to the column bracket 87.

<Regarding Action of Link Mechanism>

Figure 11A:
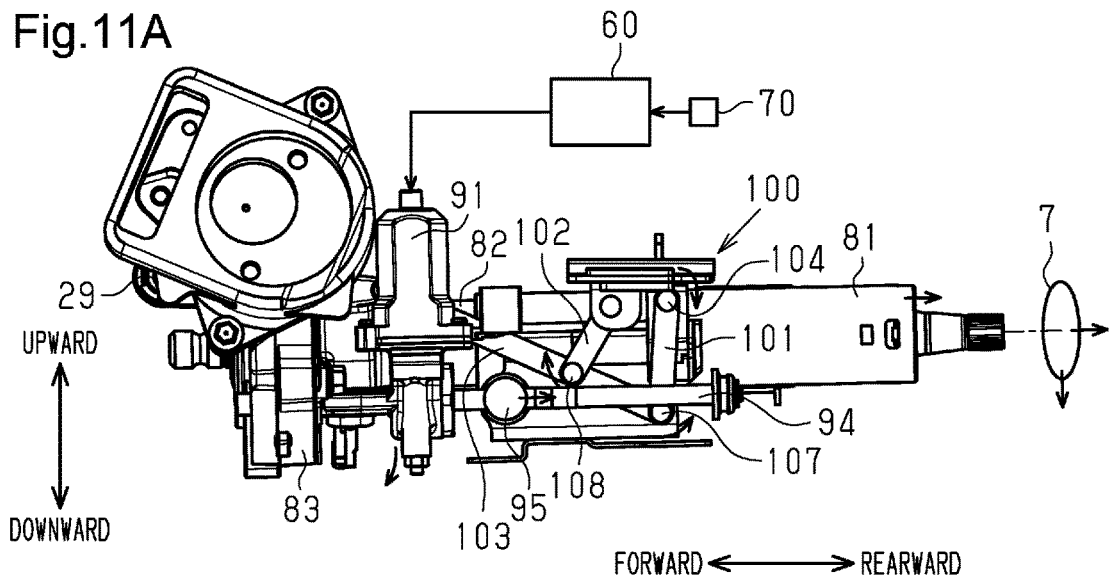
FIG. 11A to FIG. 11C are diagrams for describing actions of a link mechanism in the steering column device in FIG. 9.

The first state illustrated in FIG. 11A is a state in which the feed nut 95 comes closest to the position adjustment motor 91, i.e., the housing 83. The first link member 101 is in a state in which the first end provided with the fastening member 104 is positioned most forward and most upward. The second link member 102 is in a state in which the second end provided with the fastening member 108 is positioned most rearward and most downward. The third link member 103 is in a state in which the first end provided with the fastening member 107 is positioned most downward. In this case, the link mechanism 100 as a whole has the smallest dimension in the front-rear direction, and also the largest dimension in the up-down direction. The upper tube 81 has moved most forward, and also the lower tube 82 has moved most upward. The steering wheel 7 is in a state of being adjusted to the most forward position in the front-rear direction and also to the most upward position in the up-down direction.

In the first state, the position adjustment motor 91 rotates the screw shaft 94 by motor torque generated by rotation in a first direction. The feed nut 95 moves rearward, which is the direction of receding away from the housing 83, in conjunction with the rotation of the screw shaft 94. The upper tube 81 moves rearward in conjunction with the movement of the feed nut 95. The first link member 101 turns in conjunction with the movement of the upper tube 81, so that the first end moves rearward and downward. The third link member 103 turns in conjunction with the turning of the first link member 101, so that the first end moves upward. The second link member 102 turns in conjunction with the turning of the third link member 103, so that the second end moves forward and upward. In this case, the link mechanism 100 as a whole acts such that the dimension in the front-rear direction increases and the dimension in the up-down direction decreases. Thus, the upper tube 81 moves rearward in conjunction with the movement of the feed nut 95, and also the lower tube 82 moves downward in conjunction with the movement of the feed nut 95. The position of the steering wheel 7 is adjusted to move rearward and also to move downward. Thereafter, the position adjustment motor 91 maintains rotation in the first direction, so as to rotate the screw shaft 94, and as a result, the steering column 3 is in an intermediate state in which the feed nut 95 has moved to approximately the middle of the movable range of the screw shaft 94 in the axial direction.

Figure 11B:
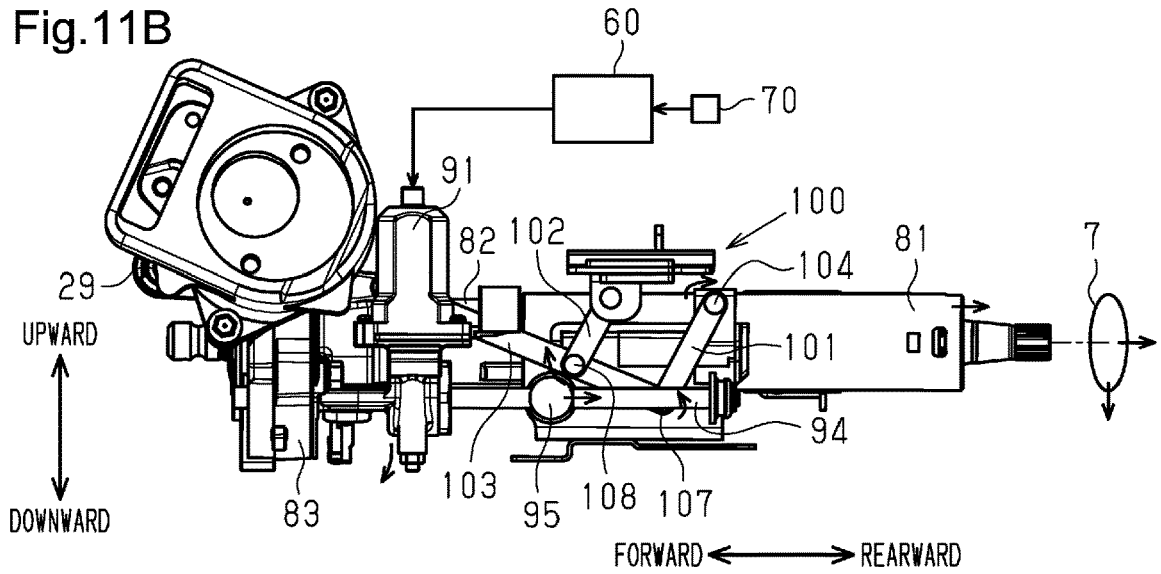

In the intermediate state, as illustrated in FIG. 11B, the first link member 101 is inclined by approximately the same amount as the second link member 102, as a result of turning such that the first end thereof moves rearward and downward. The position of the first end of the third link member 103 is in a state of being approximately aligned with the position of the screw shaft 94 in the up-down direction. The upper tube 81 has moved to approximately the middle of the movable range in the front-rear direction, and also the lower tube 82 has moved to approximately the middle of the movable range in the up-down direction. The steering wheel 7 is in a state of being adjusted to approximately the middle position in the front-rear direction and also to approximately the middle position in the up-down direction.

In the intermediate state, the position adjustment motor 91 further rotates the screw shaft 94 by motor torque generated by rotation in the first direction. The feed nut 95 moves further rearward, which is the direction of receding away from the housing 83, in conjunction with the rotation of the screw shaft 94. The upper tube 81 moves further rearward in conjunction with the movement of the feed nut 95. The first link member 101 turns in conjunction with the movement of the upper tube 81, so that the first end thereof moves further rearward and downward. The third link member 103 turns in conjunction with the turning of the first link member 101, so that the first end thereof moves further upward. The second end of the second link member 102 turns further forward and upward in conjunction with the turning of the third link member 103. In this case, the link mechanism 100 as a whole acts such that the dimension in the front-rear direction further increases and the dimension in the up-down direction further decreases. Accordingly, the upper tube 81 moves further rearward in conjunction with the movement of the feed nut 95, and also the lower tube 82 moves further downward in conjunction with the movement of the feed nut 95. The position of the steering wheel 7 is adjusted to move further rearward and also to move further downward. Thereafter, the position adjustment motor 91 maintains rotation in the first direction so as to rotate the screw shaft 94, and as a result, the steering column 3 is in the second state in which the feed nut 95 is the farthest away from the housing 83.

Figure 11C:
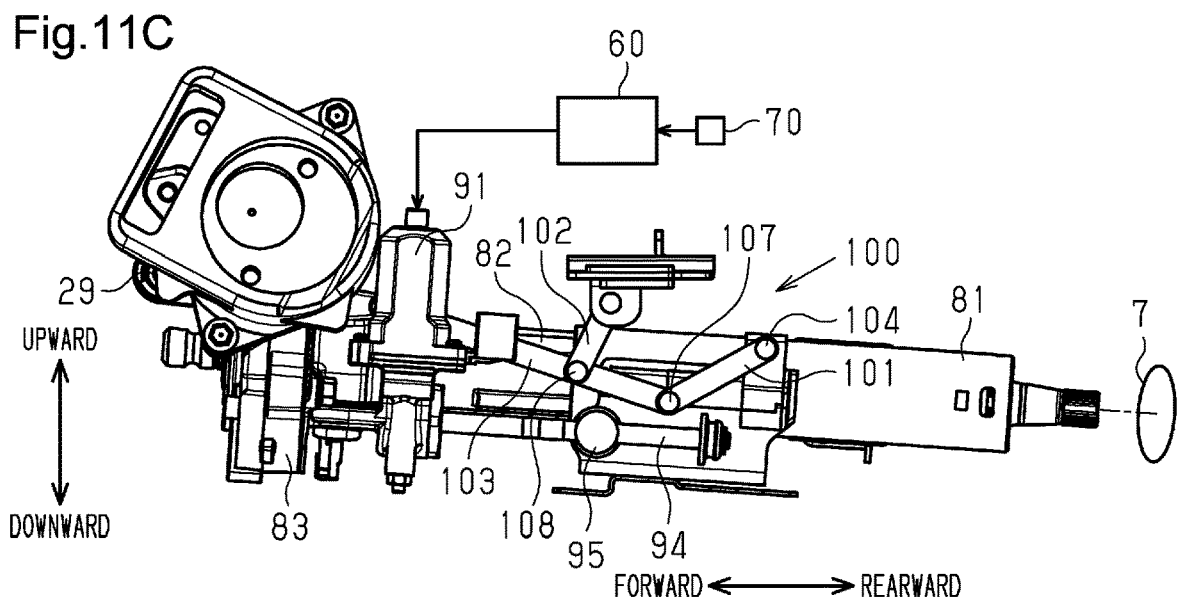

In the second state, as illustrated in FIG. 11C, the first end of the first link member 101 is in a state of being positioned most rearward and most downward. The second link member 102 is in a state in which the second end thereof is positioned most forward and most upward. The third link member 103 is in a state in which the first end thereof is positioned most upward. In this case, the link mechanism 100 as a whole has the largest dimension in the front-rear direction, and also has the smallest dimension in the up-down direction. The upper tube 81 has moved most rearward, and also the lower tube 82 has moved most downward. The steering wheel 7 is in a state of being adjusted to the most rearward position in the front-rear direction and also to the most downward position in the up-down direction.

In the second state, the position adjustment motor 91 rotates the screw shaft 94 by motor torque generated by rotation in a second direction. The feed nut 95 moves forward to a position closest to the housing 83 in conjunction with the rotation of the screw shaft 94. The upper tube 81 moves forward to the most forward position in conjunction with the movement of the feed nut 95. The first link member 101 turns in conjunction with the movement of the upper tube 81 so that the first end thereof moves to the most forward and most upward position. The third link member 103 turns in conjunction with the turning of the first link member 101, so that the first end thereof moves to the most downward position. The second link member 102 turns in conjunction with the turning of the third link member 103, so that the second end thereof moves to the most downward position. In this case, the link mechanism 100 as a whole acts such that the dimension in the front-rear direction is the smallest, and the dimension in the up-down direction is the largest. Thus, the upper tube 81 moves to the most forward position in conjunction with the movement of the feed nut 95 and also the lower tube 82 moves to the most upward position in conjunction with the movement of the feed nut 95. The steering wheel 7 is in a state of being adjusted to the most forward position in the front-rear direction and also to the most upward position in the up-down direction. That is to say, the state of the steering column 3 changes from the second state to the first state through the intermediate state.

The position adjustment motor 91 causes action of the link mechanism 100 via the feed screw mechanism 92. When the motor torque is transmitted to the link mechanism 100, the link mechanism 100 acts so that the pivoting of the lower tube 82 in the tilt direction and the movement of the upper tube 81 in the telescopic direction are in conjunction. Accordingly, the up-down direction position and the front-rear direction position of the steering wheel 7 can be adjusted at once, in the same way as with the first embodiment.

Thus, the link mechanism 100 couples the upper tube 81 and the lower tube 82 so as to be in conjunction. Regarding adjustment of the position of the steering wheel 7, the position adjustment motor 91 and the feed screw mechanism 92 can be shared between the mechanism for adjusting the up-down direction position and the mechanism for adjusting the front-rear direction position.

Effects of Second Embodiment (2-1) The link mechanism 100 is coupled with the upper tube 81, and the feed nut 95 is coupled with the upper tube 81 alone. This eliminates the need to couple the link mechanism 100 and the feed nut 95 in a configuration in which the lower tube 82 is fitted to the inner peripheral portion of the upper tube 81, and accordingly restrictions on the layout of the screw shaft 94 and the feed nut 95 can be relaxed. This is effective in improving installability of the steering column device 1 in the vehicle when adopting a configuration in which the lower tube 82 is fitted to the inner peripheral portion of the upper tube 81.

Other Embodiments

The above embodiments may be modified as follows. The following other embodiments can be combined insofar as no technical contradiction arises.

In the first embodiment, the link mechanism 50 may be configured such that, when the upper tube 81 has moved most forward, the lower tube 82 is in a state of having moved most downward. In this case, the link mechanism 50 can be configured such that, when the upper tube 81 has moved most rearward, the lower tube 82 is in a state of having moved most upward. When adopting the other embodiments described here, the same effects as those of the first embodiment can be obtained. The same applies to the second embodiment.

In the above-described first embodiment, the shape of the feed nut 45 can be changed as appropriate as long as the shape is one that is capable of transmitting motor torque to the link mechanism 50. The same applies to the second embodiment.

In the first embodiment, the reduction mechanism 43 may be omitted. In this case, the rotation of the position adjustment motor 41 may be directly transmitted to the screw shaft 44. The same applies to the second embodiment.

In the first embodiment, the feed nut 45 can also be coupled to the lower tube 22. In this case, a link mechanism can be added to enable the lower tube 22 to pivot in the up-down direction in conjunction with the movement of the feed nut 45 in the front-rear direction, and so forth. Also, the link mechanism 50 can be configured so that the upper tube 21 moves in the front-rear direction in conjunction with the movement of the feed nut 45 in the front-rear direction described herein. The same applies to the second embodiment.

In the first embodiment, the shapes of the nut link member 51 and the bracket link plate 52 of the link mechanism 50 can be changed as appropriate, when, with regard to the steering wheel 7, the position thereof can be adjusted in the up-down direction and the position thereof can be adjusted in the front-rear direction. This also applies to the support plate portion 22b and the bracket plate portion 27c. The other embodiments described herein can similarly be applied to the second embodiment. In this case, in the second embodiment, the shapes of the first link member 101, the second link member 102, and the third link member 103, of the link mechanism 100, can be changed as appropriate, when with regard to the steering wheel 7, the position thereof can be adjusted in the up-down direction and the position thereof can be adjusted in the front-rear direction. This also applies to the support plate portion 81b and the bracket plate portion 87c.

In each of the above embodiments, the steering column device 1 may make up part of a steer-by-wire steering device, in which a power transmission path between the steering wheel 7 and the steered wheels is mechanically separated.

The invention claimed is:

1. A steering column device comprising:
a lower tube that is configured to be attached to a vehicle body so as to be pivotable in an up-down direction of a vehicle;
a column shaft that is configured to receive attachment of a steering wheel of the vehicle;
an upper tube that rotatably supports the column shaft and that also is attached to the lower tube so as to be movable in a front-rear direction of the vehicle;
a motor for generating motor torque that is power for causing pivoting of the lower tube in the up-down direction and also movement of the upper tube in the front-rear direction;
a link mechanism that couples the lower tube and the upper tube so as to be capable of moving in conjunction; and
a power transmission mechanism that acts to transmit the motor torque to the link mechanism, wherein the link mechanism is configured to act to cause the pivoting of the lower tube in the up-down direction and the movement of the upper tube in the front-rear direction to be performed in conjunction, when the motor torque is transmitted to the link mechanism by the power transmission mechanism, wherein
the power transmission mechanism includes
a screw shaft that extends in the front-rear direction and that also rotates about an axial line extending in the front-rear direction under the motor torque, and
a feed nut that is coupled to the upper tube and that moves in the front-rear direction along the screw shaft by the screw shaft rotating; and
the feed nut is configured to, when moving in the front-rear direction, move the upper tube in the front-rear direction and also move the lower tube in the up-down direction via the link mechanism.

2. The steering column device according to claim 1, further comprising a reduction mechanism that couples the motor with the power transmission mechanism, wherein the reduction mechanism is configured to transmit the motor torque that is obtained by reduction of rotations of the motor to the power transmission mechanism.

3. The steering column device according to claim 1, further comprising a column bracket that is configured to be attached to the vehicle body, wherein:
the upper tube is fitted to an inner peripheral portion of the lower tube;
the link mechanism couples the lower tube with the column bracket and the feed nut; and
the feed nut couples the upper tube to the link mechanism.

4. The steering column device according to claim 1, further comprising a column bracket that is configured to be attached to the vehicle body, wherein:
the lower tube is fitted to an inner peripheral portion of the upper tube;
the link mechanism couples the upper tube with the column bracket; and
the feed nut is coupled with the upper tube alone.

5. The steering column device according to claim 1, wherein the link mechanism is configured to act to, when the motor torque is transmitted to the link mechanism by the power transmission mechanism, cause upward or downward pivoting of the lower tube in the up-down direction, and rearward or forward movement of the upper tube in the front-rear direction, to be performed in conjunction.

* * * * *